Sept. 25, 1945.　　　A. J. PENICK　　　2,385,463
GATE VALVE ASSEMBLY
Filed Jan. 8, 1944　　　2 Sheets-Sheet 1

Inventor
Arthur J. Penick
By
E. J. Hardway.
Attorney

Sept. 25, 1945.   A. J. PENICK   2,385,463
GATE VALVE ASSEMBLY
Filed Jan. 8, 1944   2 Sheets-Sheet 2

Inventor
Arthur J. Penick
By
E. V. Hardway,
Attorney

Patented Sept. 25, 1945

2,385,463

UNITED STATES PATENT OFFICE 2,385,463

GATE VALVE ASSEMBLY

Arthur J. Penick, Houston, Tex.

Application January 8, 1944, Serial No. 517,590

3 Claims. (Cl. 251—71)

This invention relates to a gate valve assembly.

An object of the invention is to provide a valve construction specially adapted for connection into a fluid conducting line and embodying a casing and a controlling assembly therein movable to one position to close the line and movable to another position to provide a continuous flowway through the casing of approximately uniform diameter so that there will be no obstructions or cavities to collect foreign matter, or objects, that may be contained in the liquid flowing through the line.

Another object of the invention is to provide a valve assembly of the character described equipped with novel valve means for effectively closing the line when the controlling assembly is moved to closed position.

With the above and other object in view, the invention has particular relation to certain novel features of construction, operation and arrangement of parts an example of which is given in this specification and illustrated in the accompanying drawings wherein—

Figures 1, 2:
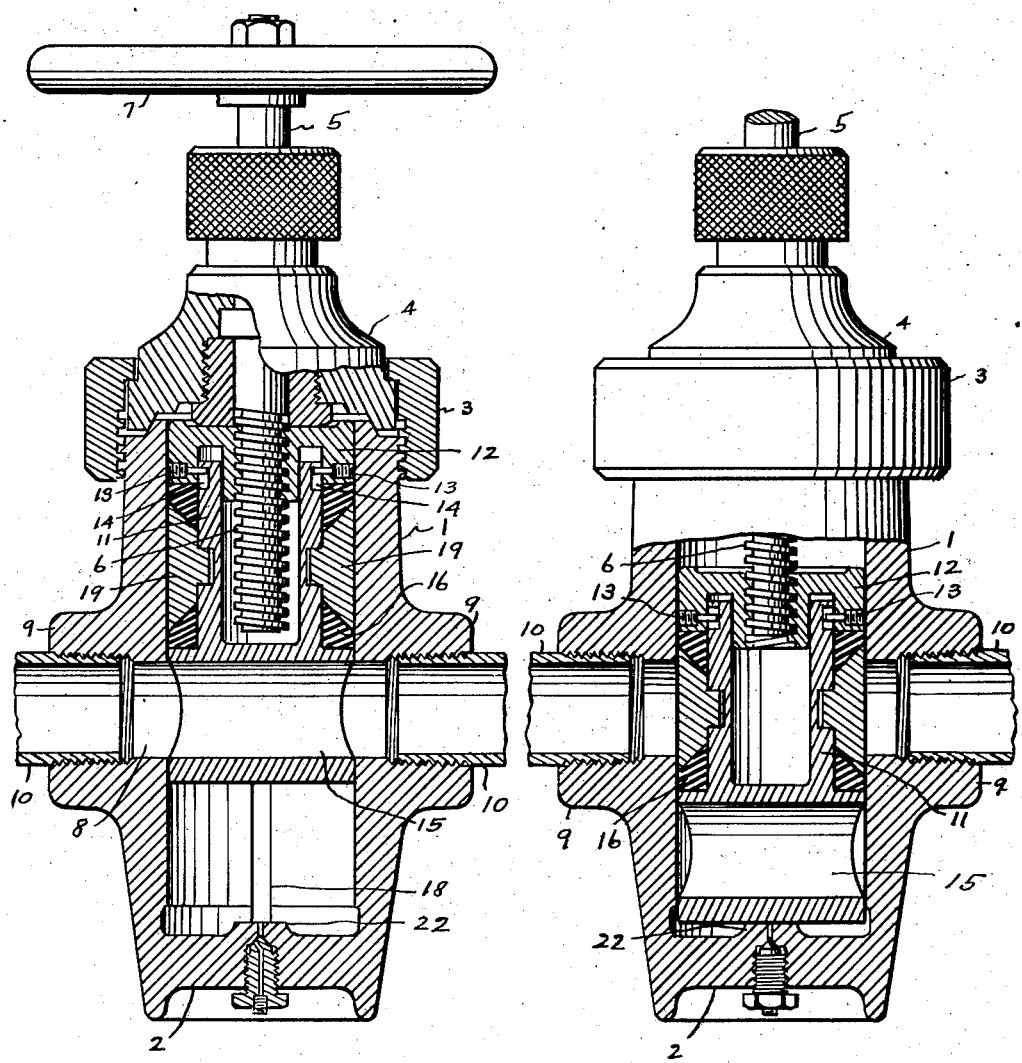
Figure 1 shows a side elevation, of the assembly, shown partly in section and showing the valve in open position.
Figure 2 shows a similar view showing the valve closed.

Referring now more particularly to the drawings wherein like numerals of reference designate the same parts in each of the figures, the numeral 1 designates the valve casing which is of a general cylindrical shape and one end 2 of which is closed.

Secured onto the other end of the casing, by the clamp 3, there is the bonnet 4.

A valve stem 5, extends through the bonnet into the casing and has a swivelling connection with the bonnet. The inner end of this stem is formed with coarse threads 6 and fixed on the outer end of the stem is the hand wheel 7.

The valve casing has a transverse flowway 8 therethrough and around this flowway has the pipe connections 9, 9, provided for the connection thereto of adjacent pipe sections 10.

Fitted within the casing there is a cylindrical controlling assembly embodying a tubular core 11, one end of which is closed by a cap 12 which is fitted thereover. This cap 12 has the radial screws 13, 13, threaded therethrough and whose inner ends project into external longitudinal slots 14, 14, in the core whereby the cap has a limited longitudinal movement on the core. At its other end the core is enlarged and extended and formed with a transverse flowway 15.

Surrounding the core and fitted between the enlarged end thereof and cap 12 there is a sleeve 16 formed of rubber or other resilient material. The core 11 and cap 12 are formed of metal or other rigid material and the threaded end of the stem 5 is threaded through the cap 12 so that by turning the stem the controlling assembly may be moved to open or closed position.

The controlling assembly has a longitudinal external key way 17 extending from end to end thereof and the casing has an internal longitudinal key which fits in said keyway to hold the controlling assembly against turning.

Figures 3, 4:
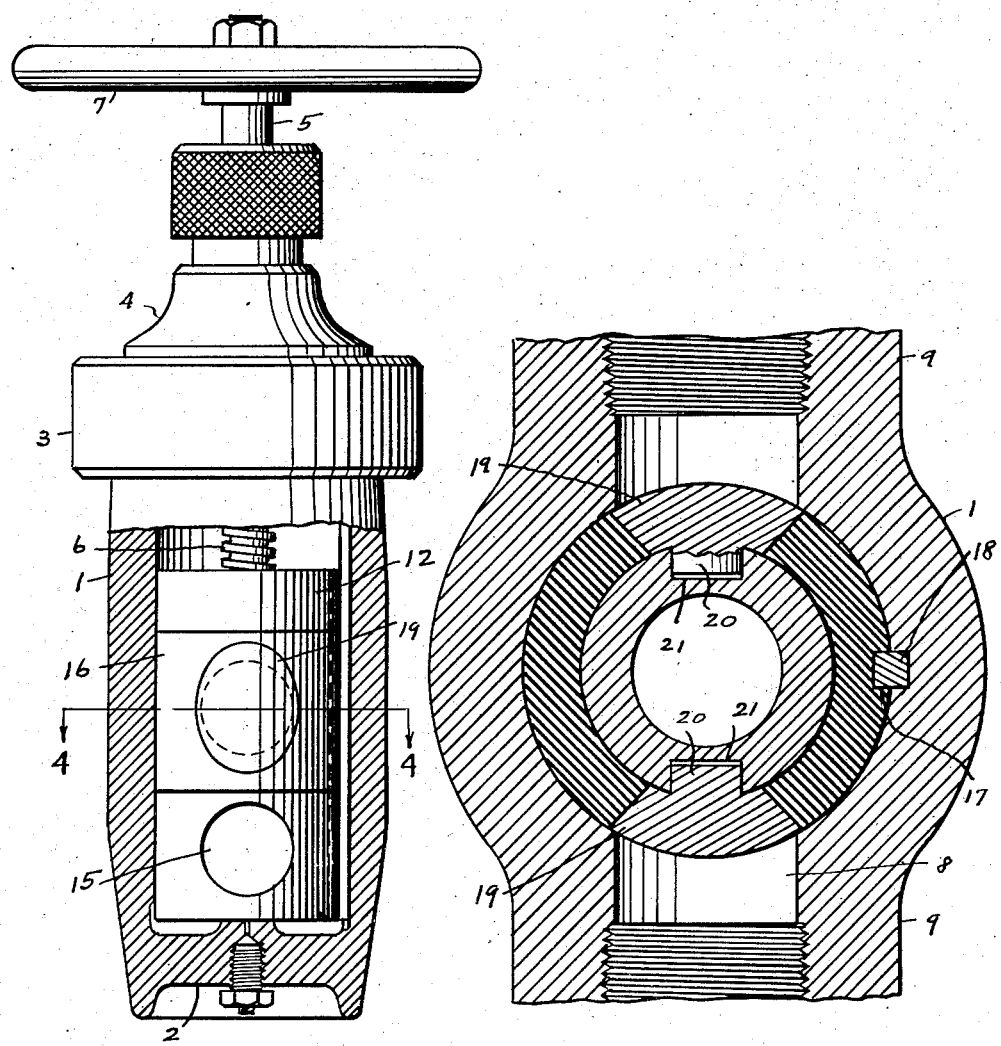
Figure 3 shows a side elevation, partly in section, taken at right angles to the view show in Figure 2.
Figure 4 shows an enlarged, transverse, sectional view taken on the line 4—4 of Figure 3.

Countersunk into the sleeve 16 are the valves 19 formed of metal or other rigid material and whose outer surfaces are flush with the outer surface of the sleeve. These valves taper inwardly and terminate in bosses 20, 20, which fit into sockets 21, 21, in the core 11 as more clearly shown in Figure 4.

When the valve is open the flowway 15 will align with the flowway 8 and the sleeve 16 will be collapsed as shown in Figure 1. A smooth flowway of uniform diameter will thus be provided through the valve casing so that no obstruction will be offered to the flow of fluid through the assembly and there will be no cavities for the collection of foreign matter or objects which might interfere with the movement of the controlling assembly. Upon rotation of the stem 5 the controlling assembly may be moved to another position, shown in Figure 2 and into contact with the stop 22. This will carry the flowway 15 out of alignment with the flowway 8 and will carry the valves 19 into alignment with the flowway 8. Upon further rotation of the stem 5, in the same direction, the cap 12 will be forced against the sleeve 16 exerting endwise pressure thereon and expanding the same thus forcing the valves 19 into close fitting contact with the inside walls of the casing around the flowway 8 and completely closing said flowway on both sides of the controlling assembly.

Upon reverse rotation of the stem 5, the cap 12 will be moved in the opposite direction and the inner ends of the screws 13 will engage the opposing ends of the slots 14.

The compression will be relieved from the sleeve 16 and it will contract to release the valves 19 from the casing wall and upon further rotation of the stem, in the last mentioned direction, the controlling assembly will be moved to the position shown in Figure 1 which with the flowway 15 aligned with the flowway 8.

The drawings and the description are illustrative merely, while the broad principle of the invention will be defined by the appended claims.

What I claim is:

1. A valve assembly comprising a valve casing having a passageway for fluid therethrough, valve means in the casing movable to one position to open the passageway and to another position to close the passageway said valve means including a rigid core and a sleeve of resilient material around the core and a valve of rigid material incorporated into the sleeve and having a slidable connection with the core and positioned to register with the passageway when the valve means is moved to said other position, and means for applying an endwise compressive force to the sleeve to expand the same and to force the valve into contact with the casing wall around said passageway.

2. A valve assembly comprising a valve casing having a passageway for fluid therethrough, a controlling assembly in the casing including a rigid core enlarged at one end forming an external shoulder and having a flowway therethrough, a resilient sleeve around the core abutting said shoulder, valves of rigid material countersunk into said sleeve, a cap connected to the core and abutting the other end of said sleeve, means operatively connected with the cap for moving the controlling assembly to one position to align the flowway thereof with said passageway and for moving the controlling assembly to another position with the sleeve aligned with the passageway to close the same, said moving means being operative to actuate the cap to apply an endwise compressive force to the sleeve, when the controlling assembly is in said other position, to expand the sleeve, said sleeve and valves having coacting tapering faces effective to force said valves outwardly, when the sleeve is expanded, to form a fluid tight seal with the casing around said passageway.

3. A valve assembly comprising a valve casing having a passageway for fluid therethrough, a controlling assembly in the casing movable to one position to open the passageway and to another position to close the passageway, said controlling assembly including a rigid core and a sleeve of resilient material around the core and valves of rigid material incorporated into the sleeve and positioned to register with the passageway when the said controlling assembly is moved to said other position, means for connecting said valves to said core and effective to confine the valves to radial movement only relative to the core and means for applying an endwise compressive force to the sleeve to expand the same and to force the valves into contact with the casing wall around said passageway.

ARTHUR J. PENICK.